(12) United States Patent
Bent et al.

(10) Patent No.: US 10,191,973 B1
(45) Date of Patent: Jan. 29, 2019

(54) PATENT ANALYTICS USING MAPREDUCE CLUSTERING

(71) Applicant: EMC IP Holding Company LLC, Hopkinton, MA (US)

(72) Inventors: John M. Bent, Los Alamos, NM (US); Sorin Faibish, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1107 days.

(21) Appl. No.: 14/040,943

(22) Filed: Sep. 30, 2013

(51) Int. Cl.
*G06F 17/30* (2006.01)

(52) U.S. Cl.
CPC ............................. *G06F 17/30705* (2013.01)

(58) Field of Classification Search
USPC .......................................................... 707/737
See application file for complete search history.

(56) References Cited

U.S. PATENT DOCUMENTS

| | | | | |
|---|---|---|---|---|
| 8,869,019 | B1 * | 10/2014 | Sampath-Kumar | G06F 17/3089 715/208 |
| 2002/0035571 | A1 * | 3/2002 | Coult | G06F 17/30017 |
| 2004/0122841 | A1 * | 6/2004 | Goodman | G06Q 50/18 |
| 2004/0181427 | A1 * | 9/2004 | Stobbs | G06F 17/2785 705/36 R |
| 2004/0215657 | A1 * | 10/2004 | Drucker | G06F 17/3002 |
| 2004/0230568 | A1 * | 11/2004 | Budzyn | G06F 17/30864 |
| 2007/0073748 | A1 * | 3/2007 | Barney | G06F 17/30675 |
| 2007/0276796 | A1 * | 11/2007 | Sampson | G06F 17/30705 |
| 2008/0086442 | A1 * | 4/2008 | Dasdan | G06F 17/30584 |
| 2008/0208567 | A1 * | 8/2008 | Brockett | G06F 17/274 704/9 |
| 2011/0047166 | A1 * | 2/2011 | Stading | G06F 17/30637 707/749 |
| 2011/0047172 | A1 * | 2/2011 | Chen | G06F 17/30445 707/764 |
| 2012/0221486 | A1 * | 8/2012 | Leidner | G06Q 40/08 705/36 R |
| 2013/0159364 | A1 * | 6/2013 | Grider | G06F 17/30224 707/826 |
| 2014/0279690 | A1 * | 9/2014 | Mohanty | G06Q 40/06 705/36 R |

* cited by examiner

*Primary Examiner* — James Trujillo
*Assistant Examiner* — Aida Z Tessema
(74) *Attorney, Agent, or Firm* — Ryan, Mason & Lewis, LLP

(57) ABSTRACT

Improved techniques are provided for patent analytics using MapReduce clustering. An exemplary patent analytics method comprises obtaining one or more patent cluster keywords to query one or more public patent databases; obtaining one or more product cluster keywords to query one or more enterprise databases of an enterprise for patents related to a given product; mapping the one or more public patent databases for at least one patent cluster; reducing the map for the at least one patent cluster to obtain the at least one patent cluster; mapping the one or more enterprise databases for a plurality of patents in the one or more enterprise databases related to the given product; reducing the map for the one or more enterprise databases to identify a plurality of patents of the enterprise related to the given product; sorting the patent clusters according to one or more criteria; and processing the sorted patent clusters to obtain one or more patent analytic information.

20 Claims, 4 Drawing Sheets

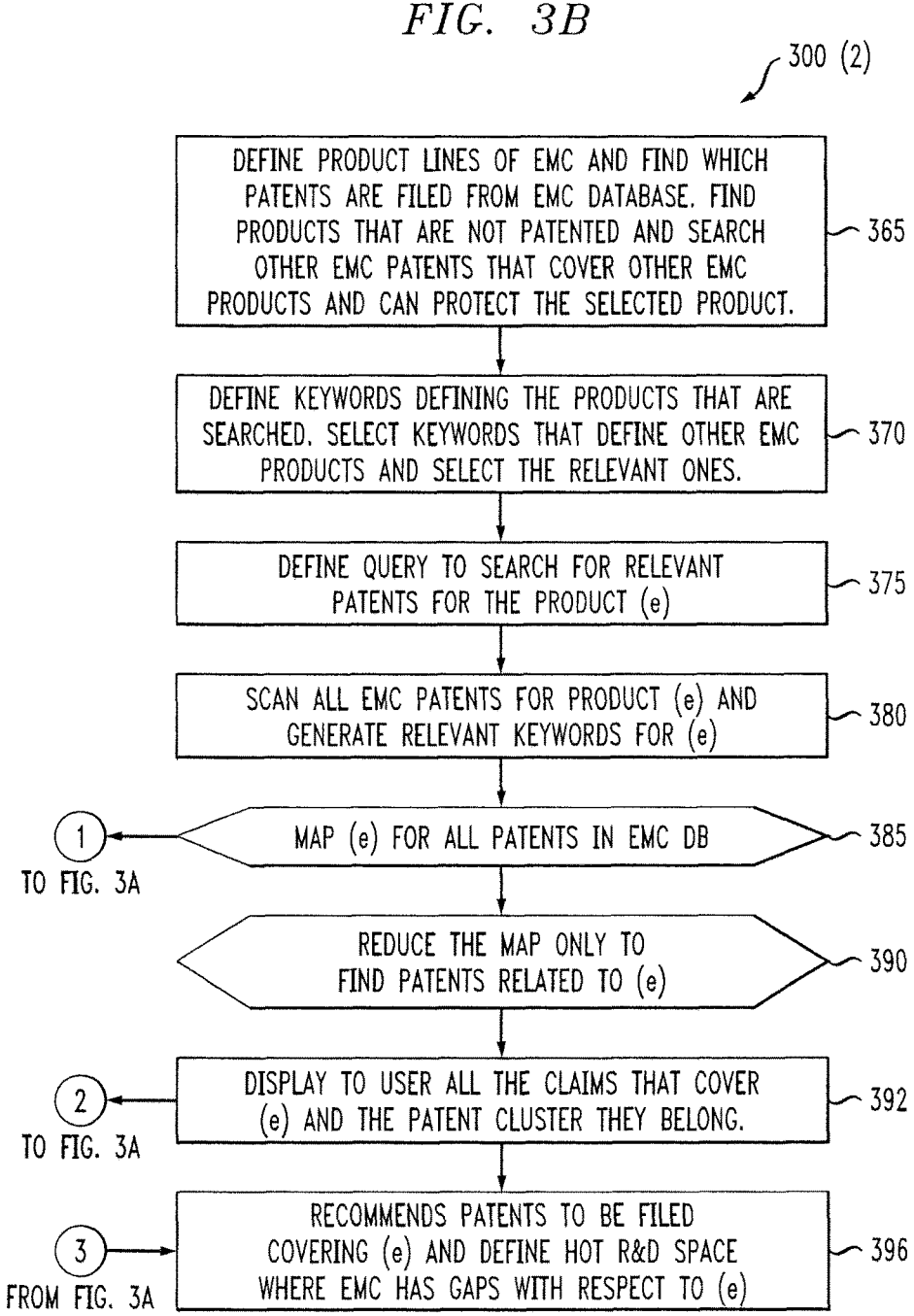

PATENT ANALYTICS USING MAPREDUCE CLUSTERING

FIELD

The present invention relates to the generation of patent analytics.

BACKGROUND

Intellectual Property Portfolio Management tools manage enterprise innovation and aim to turn such innovation into valuable intellectual property rights. Intellectual Property Portfolio Management tools typically track and nurture an innovation from conception to production and commercialization. Intellectual Property Portfolio Management tools are preferably integrated with the Research and Development (R&D) efforts of an enterprise.

Intellectual Property Management professionals often perform patent searches based on keyword strings as part of, for example, patentability and patent validity studies. In addition, Intellectual Property Management professionals often monitor published patent applications and/or issued patents to identify similar or overlapping identical technology of key competitors and/or in specific technology areas. Issued patent claims are often analyzed as part of patent assertion efforts to determine if one or more patents may be infringed by new or existing products of a competitor. Intellectual Property Management professionals also often assist with the development of new technology, based on an analysis of patent information.

Due to the ever increasing amount of available patent information, as well as the increasingly competitive global environment and the quick pace of technology advances, a need exists for improved tools for managing patent procurement and assertion using patent analytics.

SUMMARY

Embodiments of the present invention provide improved techniques for patent analytics using MapReduce cluttering. In one embodiment, a patent analytics method comprises obtaining one or more patent cluster keywords to query one or more public patent databases; obtaining one or more product cluster keywords to query one or more enterprise databases of an enterprise for patents related to a given product; mapping the one or more public patent databases for at least one patent cluster; reducing the map for the at least one patent cluster to obtain the at least one patent cluster; mapping the one or more enterprise databases for a plurality of patents in the one or more enterprise databases related to the given product; reducing the map for the one or more enterprise databases to identify a plurality of patents of the enterprise related to the given product; sorting the patent clusters according to one or more criteria; and processing the sorted patent clusters to obtain one or more patent analytic information.

In one exemplary embodiment, the map for the at least one patent cluster is optionally compared with the map for the one or more enterprise databases to remove one or more duplicate entries.

The patent analytic processing in accordance with aspects of the invention permit identification of one or more of (i) a list of one or more patent claims covering said given product; (ii) one or more patent applications to be filed covering said given product based on said sorted patent clusters; (iii) one or more patent clusters where said enterprise does not have sufficient coverage for said given product; (iv) one or more clusters associated with each of the one or more listed patent claims; (v) one or more patent applications to be filed covering the given product based on the sorted patent clusters; (vi) one or more new product areas to pursue related to the given product based on the sorted patent clusters; (vii) one or more patents of a given enterprise covering products of one or more of the given enterprise and one or more competitors of the given enterprise and (viii) one or more patent clusters where the enterprise does not have sufficient coverage for the given product. In a further variation, the patent clusters can be used to perform a patent search for one or more of a patentability and a patent validity analysis.

In various embodiments, the sorting criteria comprises one or more of a size of a given cluster, an age of elements in the given cluster; a similarity of clusters, a frequency of one or more given keywords in the given cluster and a conflict score between the given cluster and the given product.

According to another aspect of the invention, an exemplary patent analytics engine performs map operations on compute nodes that are distinct from compute nodes performing the reduce operations. In addition, the exemplary patent analytics engine stores outputs of the map operations in a Parallel Log-Structured File System and the Parallel Log-Structured File System provides the stored map operation outputs to the reduce operations.

Advantageously, illustrative embodiments of the invention provide improved techniques for patent analytics using MapReduce clustering. Patent analytics processing in accordance with aspects of the present invention provides an improved ability to manage and monitor patent procurement and assertion efforts of an enterprise, as well as assist with the development of new technology. These and other features and advantages of the present invention will become more readily apparent from the accompanying drawings and the following detailed description.

BRIEF DESCRIPTION OF THE DRAWINGS

FIGS. 3A and 3B, collectively, comprise a flowchart of an exemplary patent analytic process incorporating aspects of the present invention.

DETAILED DESCRIPTION

Illustrative embodiments of the present invention will be described herein with reference to exemplary file systems and associated clients, server, storage arrays, compute nodes and other processing devices. It is to be appreciated, however, that the invention is not restricted to use with the particular illustrative file system and device configurations shown. Accordingly, the term "file system" as used herein is intended to be broadly construed, so as to encompass, for example, distributed file systems, parallel file systems, and other types of file systems implemented using one or more processing de ices.

Aspects of the present invention provide improved tools for managing patent procurement and assertion using patent analytics. A further aspect of the invention provides a parent analytics tool using MapReduce clustering techniques. The patent clusters generated in accordance with aspects of the invention can then be sorted according to one or more predefined criteria and further processed to provide valuable analysis.

According to various aspects of the invention, the sorted patent cluster information can be analyzed to identify, for example, patent assets of a particular company covering products of the same company and/or competitors ("what you have"); gaps in the patents, products or technology of a particular company ("what you need"); and third party patents covering products or technology of a particular company ("what your competitors have"). In addition, another aspect of the invention allows the sorted patent cluster information to be used to perform efficient patent searches based on keyword strings as part of, for example, patentability and patent validity studies.

For example, as discussed further below, a "what you have" analysis can identify the core technologies and product areas, as well as the number of patent assets in any technology area. Likewise the "what you need" analysis can identify any gaps of a particular company in terms of patents, products or technologies. For example, a "what you need" analysis can identify technology areas where one or more competitors have greater depth in terms of patent coverage than a particular company, or technology areas where the patent assets of a particular company do not sufficiently cover their own product lines. In addition, the "what you need" analysis can optionally identify where additional products are needed (such as hot product areas), thus indicating where to spend additional R&D funds, where to hire additional employees, or where to acquire companies and/or technologies.

Figure 1:
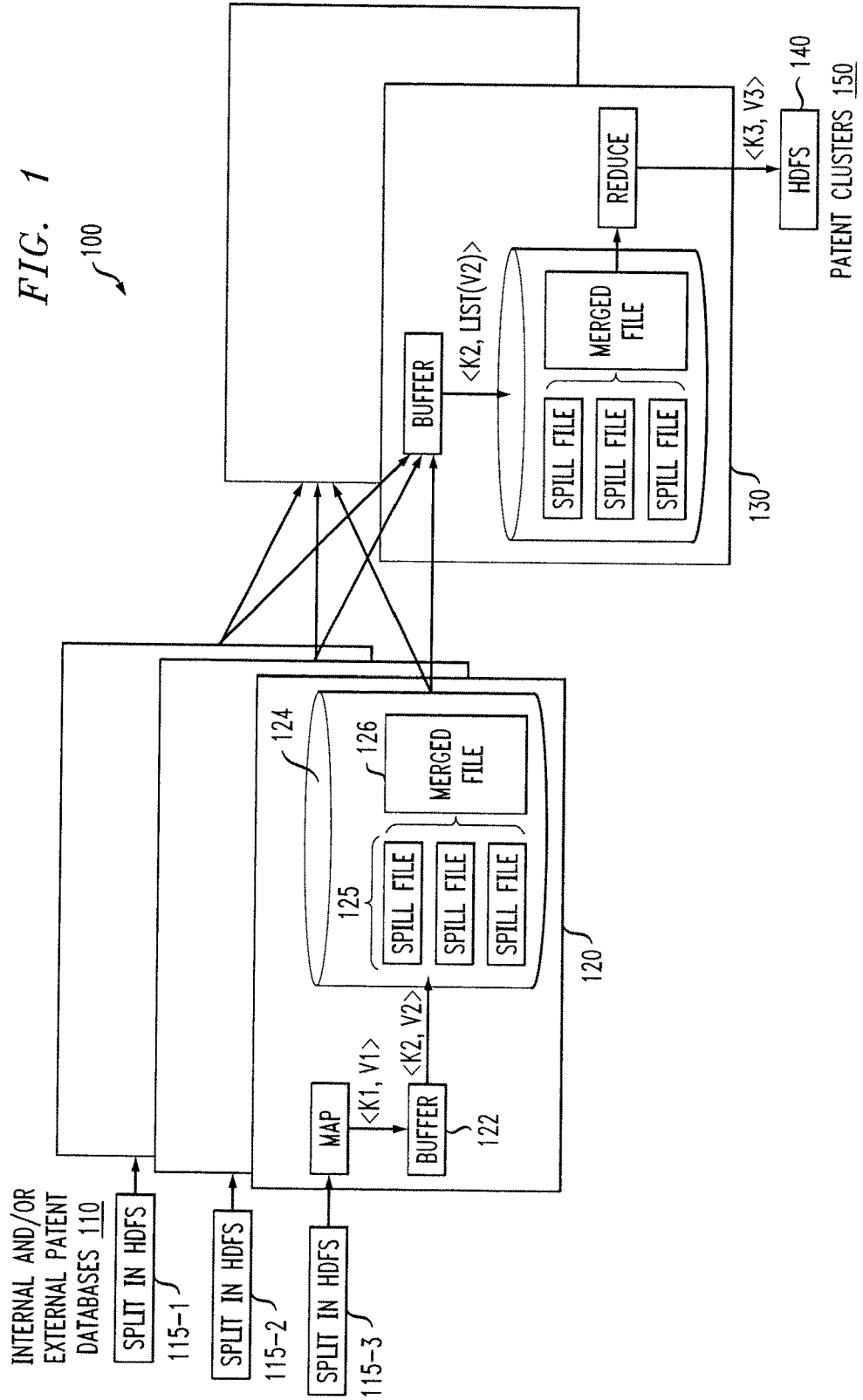
FIG. 1 illustrates an exemplary patent analytics tool with MapReduce engines in accordance with aspects of the present invention.

FIG. 1 illustrates an exemplary patent analytics tool 100 with MapReduce engines 120, 130 in accordance with aspects of the present invention. Generally, the programming model of any MapReduce implementation comprises a Map function 120 and a Reduce function 130. In an exemplary implementation of the present invention, one or more internal (e.g., private) and/or external (e.g., third party/ public) patent databases 110, discussed further below, are split among a plurality of Hadoop Distributed File System (HDFS) nodes 115-1 through 115-N.

The Map function 120 is invoked on every key-value pair from the job input split of the patent databases 110, denoted as <k1, v1>, emitting <k2, v2> pairs, in a well-known manner. The <k2, v2> pair intermediate output are then aggregated on k2, and the Reduce function 130 is passed as its input each unique value of k2 and the corresponding list of v2, generating the final result in the form of <k3, v3> by applying its processing logic, in a well-known manner. In one exemplary embodiment, the MapReduce framework is designed with a Master-Slaves architecture, where the partitioned parallel execution of Mapper and Reducer tasks across the worker nodes in a cluster are scheduled by the master node. The MapReduce framework achieves high scalability, fault tolerance and support of commodity hardware in a heterogeneous environment.

The final <k3, v3> result of the exemplary patent analytics tool 100 comprises one or more patent clusters 150, discussed further below, that are stored on at least one node of an HDFS 140.

Figure 2:
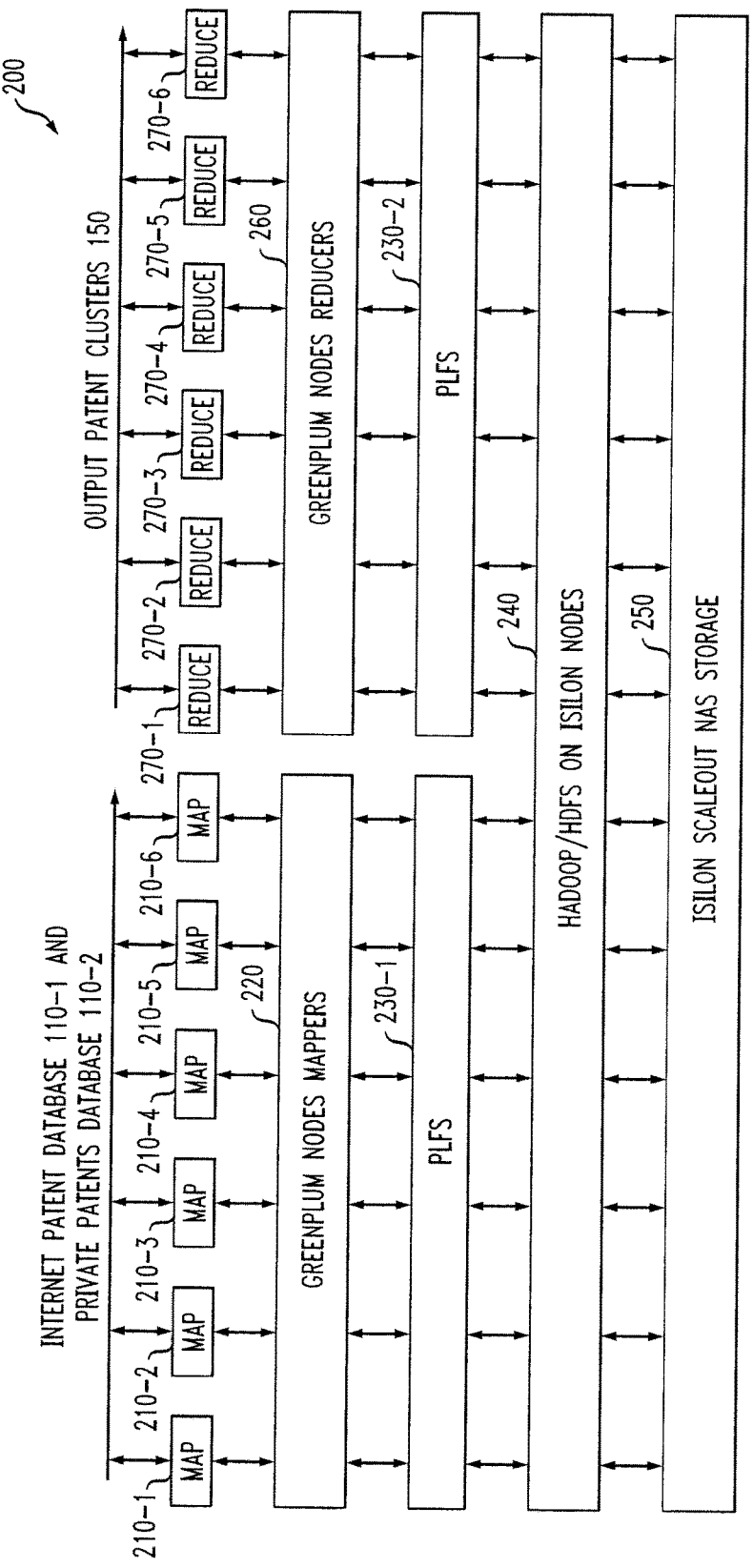
FIG. 2 illustrates an exemplary implementation of a patent analytics engine using a Parallel Log-Structured File System (PLFS)

FIG. 2 illustrates an exemplary tiered storage implementation of a patent analytics engine 200 using a Parallel Log-Structured File System (PLFS). For a detailed discussion of PLFS, see, for example, John Bent et al., "PLFS: A Checkpoint Filesystem for Parallel Applications," Int'l Conf. for High Performance Computing, Networking. Storage and Analysis 2009 (SC09) (November 2009), incorporated by reference herein.

As shown in FIG. 2, the exemplary patent analytics engine 200 processes Internet or other public patent database(s) 110-1 and private patents database(s) 110-2 (such as the patents of the enterprise performing the analytics) and generates output patent clusters 150, in a similar manner to FIG. 1. In an exemplary implementation of the present invention, the patent databases 110-1 and 110-2 are split among a plurality of map compute nodes 210-1 through 210-N(N equals 6 in the exemplary embodiment of FIG. 2).

The <k2, v2> pair intermediate outputs from the map compute nodes 210 are then processed on mapper nodes 220 of one or more compute nodes in an exemplary Greenplum Database, where data is partitioned across multiple segment servers, and each segment owns and manages a distinct portion of the overall data (there is no disk-level sharing nor data contention among segments). The mapped data can then be stored in a first tier on the PLFS nodes 230-1 and 230-2 followed by Hadoop HDFS on Isilon nodes 240 on a second tier. Among other benefits, the PLFS file system will manage the replication of stored files following the Map operation by the Map nodes 210, 220, and then deliver the appropriate replicas to the Reduce nodes 260, 270.

The lowest tier in the exemplary embodiment of FIG. 2 comprises EMC Isilon Platform Nodes and Accelerators (e.g., Scale-out Network Attached Storage (NAS)). It is to be appreciated that as different number or arrangement of storage tiers may be used in other embodiments. In general, the different storage tiers 230, 240, 250 in the embodiment of FIG. 2 comprise different types of storage devices having different performance characteristics.

On the Reduce-side, mapped data is obtained from reducer compute nodes 260 of the exemplary Greenplum Database and applied to reduce nodes 270-1 through 270-N(N equals 6 in the exemplary embodiment of FIG. 2) that generate one or more output patent clusters 150, as discussed above in conjunction with FIG. 1. As shown in FIG. 2, the reducer compute nodes 260 of the exemplary Greenplum Database and reduce nodes 270 are preferably distinct with respect to the mapper nodes 220 of the exemplary Greenplum Database and map compute nodes 210, respectively. In this manner, one aspect of the invention optionally provides specialized nodes 210, 220 for the Map function and specialized nodes 260, 270 for the Reduce function. Among other benefits, such specialized nodes permits learning.

One or more elements of the exemplary patent analytics engine 200 may be implemented at least in part in the form of software that is stored in memory and executed by a processor. The exemplary patent analytics engine 200 comprising processor, memory and network interface components is an example of what is more generally referred to herein as a "processing device." Also optionally included in the exemplary patent analytics engine 200 is network interface circuitry. The network interface circuitry allows the exemplary patent analytics engine 200 to communicate over a network with one or more additional processing devices. The network interface circuitry may comprise, for example, one or more conventional transceivers.

Being an open-source MapReduce implementation, Hadoop (in tier 240) has gained its wide adoption to process unstructured data for offline big data analytics. Geared towards batch style computation. Hadoop requires loading the entire data before processing and enforces that the output of each Mapper 210 is checkpointed to disk before being consumed by Reducers 270. A Reducer 270, in turn, downloads its share of the intermediate data from each Mapper 210 output in its entirety, and then invokes the Reduce function on each key's aggregated value. This kind of dataflow works well with a MapReduce job, in terms of batch processing, in which overall job completion time becomes a primary concern. However, in Hadoop, the blocking operation introduced by the dataflow from traditional MapReduce, more often than not, remains a prominent obstacle to run other alternative workloads like online aggregation and continuous query, which require making early prediction on results during the execution, or analyzing data immediately as it arrives.

In implementing the partition/grouping functionality for parallel processing and key aggregation, Hadoop leverages a sort-based technique. Specifically, as shown in FIG. 1, intermediate data of each Mapper 120 that fill up a buffer 122 are spilled out to a disk 124, being sorted and thus grouped by partition number and the key. After the Mapper task finishes, those spilled files 125 are merged into a single partitioned and sorted file 126. Likewise, Reducer 130 will perform a sort phase to merge all the intermediate data, commonly referred to as multi-pass merge phase. It has been shown that the sort step of a Mapper 130 is CPU-intensive and multi-pass merge can incur significant I/O costs, reinforcing blocking in job execution. Consequently, a viable approach that smooths the resource utilization involved in the sort-merge can be beneficial for avoidance of some performance bottlenecks incurred from resource contention. Apart from that, for applications in which sorting is not required by the final result, alternative aggregation approach can be exploited to further reduce the resource utilization.

Figure 3A:
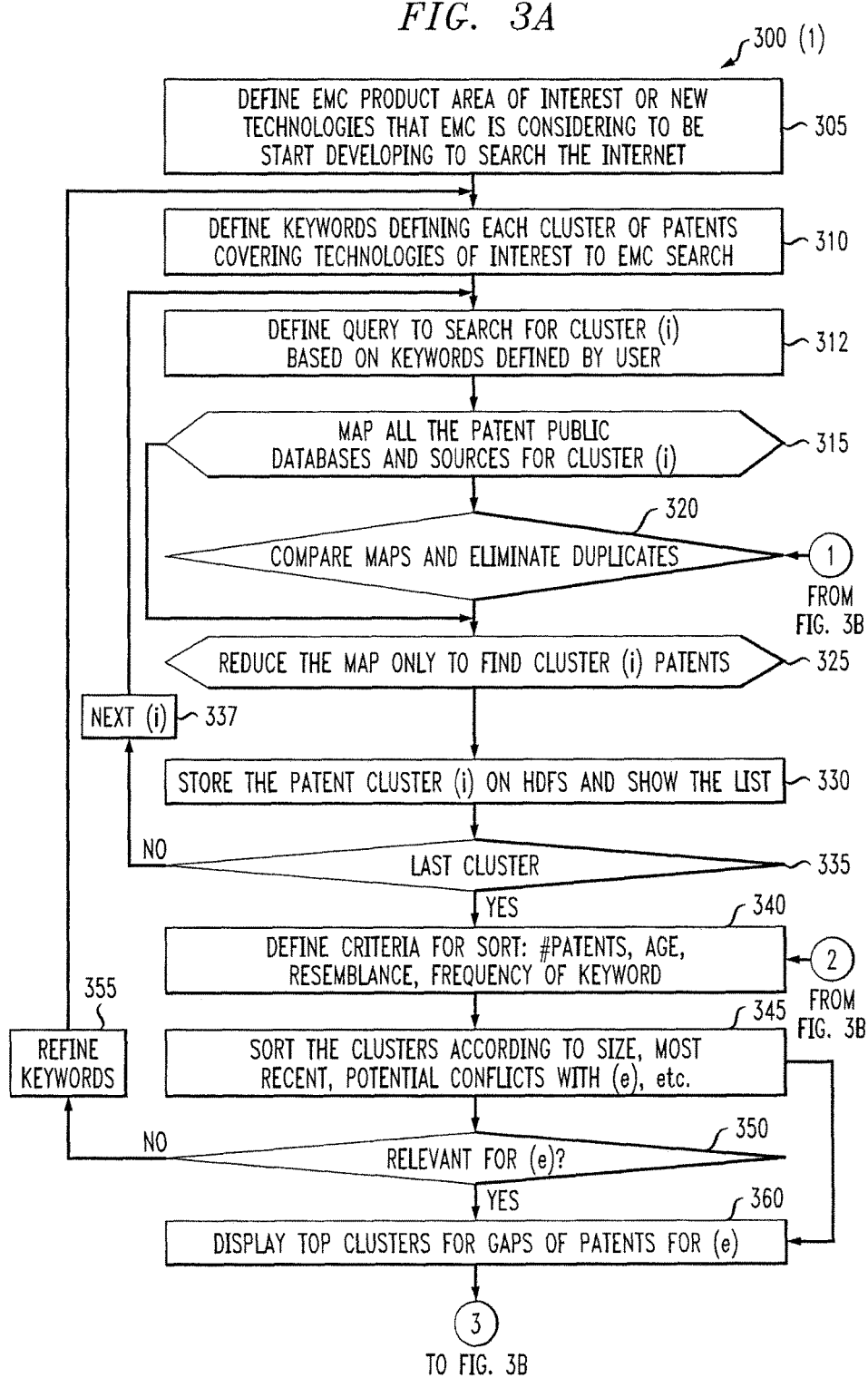

FIGS. 3A and 3B, collectively, comprise a flowchart of an exemplary patent analytic process 300 incorporating aspects of the present invention. The exemplary patent analytic process 300 is illustrated using EMC Corporation, the assignee of the present invention, as the particular company of interest. As shown in FIG. 3A, the exemplary patent analytic process 300 initially defines the EMC product area(s) of interest and/or new technologies that EMC is considering to develop, for a keyword search during step 305. Thereafter, keywords are defined by a user during step 310 for each cluster of patents covering technologies of interest to the EMC search.

The keywords from step 310 are automatically mapped during step 312 to define a query to search for a cluster (i), where i is an index incremented during each loop. The patent public databases 110 and other patent sources are mapped for cluster (i) during step 315. As discussed further below in conjunction with FIG. 3B, maps are received by step 320 from processing described in FIG. 3B and compared to the maps generated during step 315 to eliminate duplicate maps. Generally, step 320 removes duplication between the maps from the general databases and the maps based on the databases of the exemplary company EMC. Such duplication may result from patents from the map (e) for all patents in the enterprise database (step 385) that are also in the cluster (i) from the public patent databases, or also when new data is added. In this manner, the disclosed exemplary patent analytics tool can learn and identify those patents and/or clusters that are new relative to a prior execution of the patent analytic process 300.

Thereafter, the map is reduced during step 325 to only find cluster (i) patents. The patent cluster (i) is stored, for example, on HDFS 240 during step 330 and a list can be presented to a user. A test is performed during step 335 to determine if cluster (i) is the last cluster. If it is determined during step 335 that cluster (i) is not the last cluster, then the index i is incremented during step 337 and program control returns to step 312. If, however, it is determined during step 335 that cluster (i) is the last cluster, then a criteria is defined during step 340 for a sort, such as a number of patents, age, resemblance, or frequency of keyword. The clusters are then sorted during step 345 according to, for example, cluster size (number of members, most recent (for example, based on number of patents issued, filed or published in past year) or potential conflicts with products (c) (FIG. 3B).

A further test is performed during step 350 to determine if the sorted patent clusters are relevant to products (e). If it is determined during step 350 that the sorted patent clusters are not relevant to products (e), then the keywords are refined during step 355 and program control returns to step 310. If, however, it is determined during step 350 that the sorted patent clusters are relevant to products (e), then the top clusters are displayed for gaps of patents for products (c) during step 360. Program control then proceeds to step 396 (FIG. 3B, discussed below).

FIG. 3B is a flowchart of an exemplary portion of the patent analytic process 300 incorporating aspects of the present invention. Steps 365, 370, 375, 380 of FIG. 3B can optionally be performed in parallel to Steps 305, 310, 312, 315 of FIG. 3A.

As shown in FIG. 3B, product lines of the exemplary company EMC are defined during step 365 and the patents that are filed are identified from the database(s) of exemplary company EMC. In addition, products that are not patented are identified and other EMC patents that cover other EMC products and can protect the selected product are searched.

Keywords are defined by a user during step 370 defining the products that are searched. Keywords are selected that define other EMC products and the relevant ones are selected. The keywords from step 370 are automatically mapped during step 375 to define a query to search for relevant patents for the product (e). All patents of the exemplary company EMC are scanned during step 380 for product (c) and relevant keywords for product (e) are generated. During step 385, product (e) is mapped for all patents in the database of the exemplary company EMC. Program control then proceeds in parallel to step 320 (FIG. 3A, discussed above) and step 390. The maps are reduced during step 390 only to find patents related to (e).

Thereafter, all the claims that cover product (e) are displayed to the user during step 392 with the patent cluster to which they belong. Program control then proceeds in parallel to step 340 (FIG. 3A, discussed above) and step 396. During step 396, the exemplary patent analytic process 300 recommends patents to be filed covering product (e) and one or more "hot" R&D spaces are identified where the exemplary company EMC has gaps with respect to the product (e).

In one exemplary embodiment, the maps can be differentially updated with new data without redoing the entire MapReduce process.

In various embodiments, the two sets of clusters can be sorted based on various criteria defined in step 340 and then compared to provide the desired patent analytics. The sorted clusters can be analyzed to identify, for example, patent assets of a particular company covering products of the same company and/or competitors/potential infringers ("what you have"); gaps in the patents (e.g., unprotected products), products (need for hot products) or technology of a particular company ("what you need"); and third party patents covering products or technology of a particular company ("what your competitors have"). In addition, another aspect of the invention allows the sorted patent cluster information to be used to perform efficient patent searches based on keyword strings as part of, for example, patentability and patent validity studies.

The exemplary patent analytics engine 200 can learn from experience of past data analysis and track in real time and warn about any new trends and patent clusters and display which clusters are most likely to become hot, based on a set of criteria, such as clusters in a given technology area, with a shortage or overabundance of new applications.

The exemplary patent analytics engine 200 can also identify trends in patents that are published but not approved. This information can be used to alert team members of the risks of new technologies that may impact products and sales and when to expect competition to current products and products in development. Moreover, the exemplary patent analytics engine 200 can provide an early warning system to a patent committee of the emerging risks and actors who may be affecting the technology. This could be based in part on the behavioral changes in the variables defining each cluster and the ones at the top and how they interact with the patent committees to determine which competitors may be considering launching a new product and may pose a threat to a technology development. In this manner, corporate technology officers can follow new trends and directions in specific technologies. A given company can consider going to different technologies developed to prevent a loss of market share.

CONCLUSION

It is to be appreciated that the particular operations illustrated in FIGS. 3A and 3B are exemplary only, and numerous other types of operations may be used in other embodiments. It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the patent analytics engine 200. Such components can communicate with other elements of the patent analytics engine 200 over any type of network or other communication media.

As indicated previously, components of a patent analytics engine 200 as disclosed herein can be implemented at least in part in the form of one or more software programs stored in memory and executed by a processor of a processing device. A memory having such program code embodied therein is an example of what is more generally referred to herein as a "computer program product."

The patent analytics engine 200 or portions thereof may be implemented using one or more processing platforms each comprising a plurality of processing devices. Each such processing device may comprise processor, memory and network interface components of the type described above.

As indicated above, patent analytics engine functionality such as that described in conjunction with FIGS. 1 through 31 can be implemented at least in part in the form of one or more software programs stored in memory and executed by a processor of a processing device such as a computer or server. A memory or other storage device having such program code embodied therein is an example of what is more generally referred to herein as a "computer program product." Certain system components are implemented using a combination of software and hardware.

It should again be emphasized that the above-described embodiments of the invention are presented for purposes of illustration only. Many variations and other alternative embodiments may be used. For example, the disclosed techniques are applicable to a wide variety of other types and arrangements of file systems and associated clients, servers and other processing devices that can benefit from patent analytics functionality as described herein. Also, the particular configurations of system and device elements shown in FIGS. 1 and 2 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
    obtaining one or more patent cluster keywords to query one or more public patent databases;
    obtaining one or more product cluster keywords to query one or more enterprise databases of an enterprise for patents related to a given product;
    mapping said one or more public patent databases for at least one patent cluster;
    reducing said map for said at least one patent cluster to obtain one or more reduced patent clusters;
    mapping said one or more enterprise databases for a plurality of patents in said one or more enterprise databases related to said given product;
    reducing said map for said one or more enterprise databases to identify a reduced plurality of patents of said enterprise related to said given product;
    identifying one or more product patent clusters from said reduced patent clusters that comprise each of said reduced plurality of patents;
    sorting said reduced patent clusters and said product patent clusters according to one or more criteria; and
    comparing said sorted reduced patent clusters to said sorted product patent clusters to identify at least one of (i) one or more patents of said enterprise covering products of one or more of said enterprise and one or more competitors of said enterprise; (ii) a list of patent clusters where said enterprise does not have sufficient patent coverage for said given product; (iii) one or more third party patents covering at least one given product of said enterprise; and (iv) one or more technology areas where said enterprise needs one or more additional products.

2. The method of claim 1, further comprising the step of comparing said map for said at least one patent cluster and said map for said one or more enterprise databases to remove one or more duplicate entries.

3. The method of claim 1, further comprising the step of presenting a list of one or more patent claims covering said given product.

4. The method of claim 3, further comprising the step of identifying one or more clusters associated with each of said one or more listed patent claims.

5. The method of claim 1, wherein said criteria comprises one or more of a size of a given cluster, an age of elements in said given cluster; a similarity of clusters, a frequency of one or more given keywords in said given cluster and a conflict score between said given cluster and said given product.

6. The method of claim 1, wherein said patent clusters are used to perform a patent search for one or more of a patentability and a patent validity analysis.

7. The method of claim 1, further comprising the step of identifying one or more patent applications to be filed covering said given product based on said sorted patent clusters.

8. The method of claim 1, further comprising the step of identifying one or more new product areas to pursue related to said given product based on said sorted patent clusters.

9. A computer program product comprising a tangible machine-readable recordable storage medium having encoded therein executable code of one or more software programs, wherein the one or more software programs when executed by the processor of the processing device implement the steps of the method of claim 1.

10. A system, comprising:
a memory; and
at least one hardware device, coupled to the memory, operative to:
obtain one or more patent cluster keywords to query one or more public patent databases;
obtain one or more product cluster keywords to query one or more enterprise databases of an enterprise for patents related to a given product;
map said one or more public patent databases for at least one patent cluster;
reduce said map for said at least one patent cluster to obtain one or more reduced patent clusters;
map said one or more enterprise databases for a plurality of patents in said one or more enterprise databases related to said given product;
reduce said map for said one or more enterprise databases to identify a reduced plurality of patents of said enterprise related to said given product;
identify one or more product patent clusters from said reduced patent clusters that comprise each of said reduced plurality of patents;
sort said reduced patent clusters and said product patent clusters according to one or more criteria; and
compare said sorted reduced patent clusters to said sorted product patent clusters to identify at least one of (i) one or more patents of said enterprise covering products of one or more of said enterprise and one or more competitors of said enterprise; (ii) a list of patent clusters where said enterprise does not have sufficient patent coverage for said given product; (iii) one or more third party patents covering at least one given product of said enterprise; and (iv) one or more technology areas where said enterprise needs one or more additional products.

11. The system of claim 10, wherein said at least one hardware device is further configured to compare said map for said at least one patent cluster and said map for said one or more enterprise databases to remove one or more duplicate entries.

12. The system of claim 10, wherein said at least one hardware device is further configured to identify one or more of (i) a list of one or more patent claims covering said given product; and (ii) one or more patent applications to be filed covering said given product based on said sorted patent clusters.

13. The system of claim 10, wherein said criteria comprises one or more of a size of a given cluster, an age of elements in said given cluster; a similarity of clusters, a frequency of one or more given keywords in said given cluster and a conflict score between said given cluster and said given product.

14. The system of claim 10, wherein said patent clusters are used to perform a patent search for one or more of a patentability and a patent validity analysis.

15. The system of claim 10, further comprising the step of identifying one or more new product areas to pursue related to said given product based on said sorted patent clusters.

16. The system of claim 10, wherein said map operations are performed on compute nodes that are distinct from compute nodes performing said reduce operations.

17. The system of claim 10, wherein an output of said map operations are stored in a Parallel Log-Structured File System and wherein said Parallel Log-Structured File System provides said stored map operation outputs to said reduce operations.

18. The method of claim 1, further comprising the step of differentially updating maps with new data.

19. The method of claim 1, further comprising the step of identifying one or more technology areas where one or more competitors have greater patent coverage depth than said enterprise.

20. The system of claim 11, wherein said at least one hardware device is further configured to differentially update maps with new data.

* * * * *